Aug. 25, 1964                V. C. STERRETT ETAL                3,145,728
                    WATER FEED CONTROL VALVE FOR WATERING TROUGHS
Filed Aug. 19, 1960                                          3 Sheets-Sheet 1
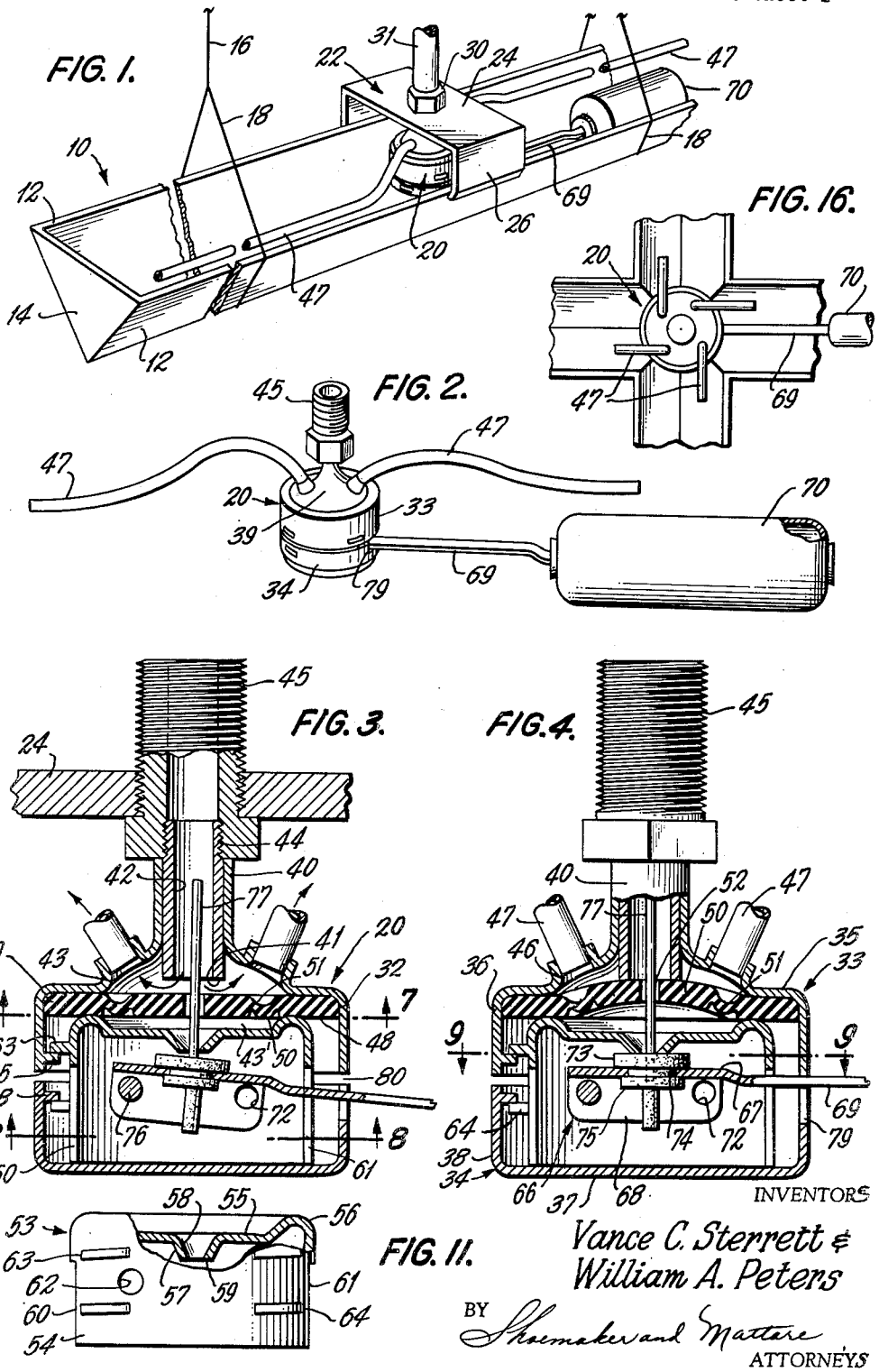
INVENTORS
Vance C. Sterrett &
William A. Peters
BY
Shoemaker and Mattare
ATTORNEYS Aug. 25, 1964  V. C. STERRETT ETAL  3,145,728
WATER FEED CONTROL VALVE FOR WATERING TROUGHS
Filed Aug. 19, 1960  3 Sheets-Sheet 2

INVENTORS
Vance C. Sterrett &
William A. Peters
BY Shoemaker and Mattare
ATTORNEYS INVENTORS
Vance C. Sterrett &
William A. Peters
BY Shoemaker and Mattare
ATTORNEYS

United States Patent Office 3,145,728
Patented Aug. 25, 1964

3,145,728
WATER FEED CONTROL VALVE FOR
WATERING TROUGHS
Vance C. Sterrett, 501 W. Linden Ave., Logansport, Ind., and William H. Peters, 218 N. East St., Montpelier, Ohio
Filed Aug. 19, 1960, Ser. No. 50,754
13 Claims. (Cl. 137—414)

This invention relates generally to the class of animal husbandry and is directed particularly to improvement in float operated valves for use in association with watering troughs.

While the float operated valve structure of the present invention is adaptable to many uses where it is desired that a constant water level or other fluid level be maintained in a receptacle, it is particularly designed for use in association with poultry watering troughs.

The poultry industry is a large one and is increasing in size from year to year and as a result thereof, associated also with keen competition between hatchery men, it is becoming more mechanized.

Poultry houses, housing in the neighborhood of 10,000 broilers, require about forty 12 foot waterers and such waterers are of many designs, some being mounted on stands or hung from overhead supports, and in such instances are adjustable and since approximately ten weeks are required for a broiler to become ready for marketing, much cleaning of the house is required and for this reason hanging waterers are becoming increasingly popular since they can be pulled up out of the way while such cleaning is in progress.

Attempts have been made to introduce the use of a watering trough suspended by cables and pulleys with means whereby such a trough of approximately 100 feet in length can be adjusted vertically with respect to the poultry house floor.

Conventional types of float operated valves for such equipment are not satisfactory because the valve functions immediately to maintain a desired level, which means that in the vicinity of the valve there would be fresh water in the trough while at a distance of say 25 feet away therefrom, the water would become stale and the birds would not drink it. Accordingly the advantages to be derived from the use of a 100 foot watering trough are nullified by this fact that fresh water cannot be maintained therein and throughout the length thereof.

It is a particular object of the present invention in view of the foregoing to provide a means whereby a long watering trough may be made use of and be supplied either continuously at a slow rate or intermittently at a rapid rate with fresh water from a supply line, in such a way that the fresh water will be distributed through the entire length of the trough instead of being merely intermittently introduced at one location by a control which merely quickly turns the water supply on and off.

Another object of the invention is to provide a control valve for use in a long water trough, which valve when opened will introduce water into the trough in the immediate vicinity of the valve and will also introduce the water into the trough at distances remote from the valve and on opposite sides thereof or towards and in the vicinity of the opposite ends of the trough, where the trough may be merely straight and continuous in one direction or whereby the water may be introduced into and toward opposite ends of a multiplicity of long troughs extending radially from the single control valve.

Still another object of the invention is to provide in a manner as hereinafter set forth, a novel valve structure employing a flexible diaphragm mounted in a casing in such a way that as the water level builds up in the trough, in which the control float for the valve is located, differential pressure will be set up on opposite sides of the diaphragm to effect the closing of the valve.

Still another object of the invention is to provide, in a manner as hereinafter set forth, a valve construction embodying a pressure operated shut-off diaphragm enclosed within a housing, together with distributing pipes or tubes by means of which water may be directed to points remote from the valve body and wherein the valve housing is adapted during the open period of the valve to permit the water or other fluid to escape directly from the housing into the area of the trough immediately adjacent thereto, whereby the trough will be replenished with fresh water, not only in the immediate vicinity of the valve but at points remote therefrom.

A still further object of the invention is to provide, in the manner as hereinafter set forth, a new and novel diaphragm valve wherein the diaphragm has a central aperture to permit liquid to pass therethrough to fill chambers on opposite sides thereof and wherein one of said chambers has a number of liquid distributing tubes connected therewith while the other chamber has a liquid outlet which is opened and closed by the falling and rising, respectively of a float element, thereby permitting, when the float is in lowered position, the passage of liquid through the distributing tubes or conduits and through the outlet at the opposite side of the diaphragm therefrom and, when the float is in the elevated position, shutting off the escape of liquid from the chambers on both sides of the diaphragm. In this action the shutting off of the fluid flow through the distributing tubes is effected by the flexion of the diaphragm in one direction by a pressure differential created by the liquid flowing into the valve structure and passing through the diaphragm aperture.

A still further object of the invention is to provide in a diaphragm valve structure of the type hereinbefore described, a novel means whereby the liquid transfer passage through the diaphragm is maintained free of obstruction or clogging by any debris which may enter the diaphragm housing.

A still further object of the invention is to provide in a valve structure of the character described, a novel means for coupling the float with the diaphragm housing of the valve whereby the float may be easily and quickly removed if and when necessary without disassembling the housing in which the diaphragm is encased.

A still further object of the invention is to provide a diaphragm valve structure having the novel features set forth in the preceding paragraph together with novel means for reversing the control float to facilitate the use of the valve structure in connection with an overhead or underneath liquid supply line.

The invention will be best understood from a consideration of the following detail description taken in connection with the accompanying drawings forming part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

FIG. 1 is a view in perspective of a portion of a single lineal suspended trough structure showing in association therewith a control valve constructed in accordance with one embodiment of the present invention;

FIG. 2 is a side perspective view of the said one embodiment of the present control valve structure;

FIG. 3 is a vertical section on an enlarged scale through the valve body shown in FIG. 2 and illustrating the position of the float actuated valve button when the valve structure is open, and illustrating the diaphragm in relaxed position to permit inflow of water to and through the housing;

FIG. 4 is a view corresponding to FIG. 3 but showing the position of the float actuated valve button when the valve structure is closed and illustrating the flexed position of the diaphragm under the effect of the differential pressures on the two sides thereof;

FIG. 11 is a view in elevation of the inner cylindrical member of the valve housing;

FIG. 16 is a diagrammatic view illustrating a construction wherein the valve housing is equipped with a multiplicity of water distributing tubes or conduits, here shown as four, for supplying water to a trough having a number of extensions or arms.

Figure 5:
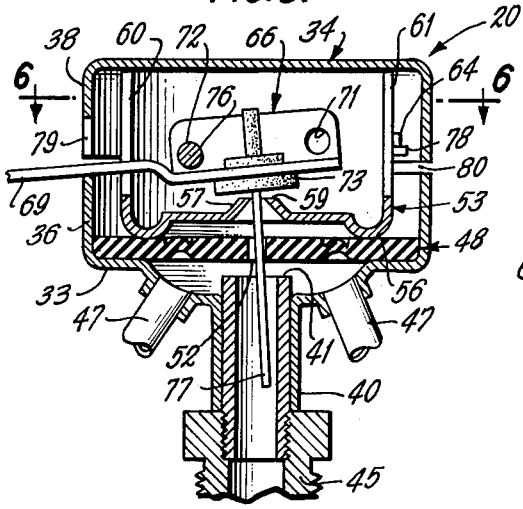
FIG. 5 is a view illustrating the arrangement and mounting of interior parts of the valve structure when the latter is set up for use in the inverted position from that shown in FIGS. 3 and 4.
Figure 6:
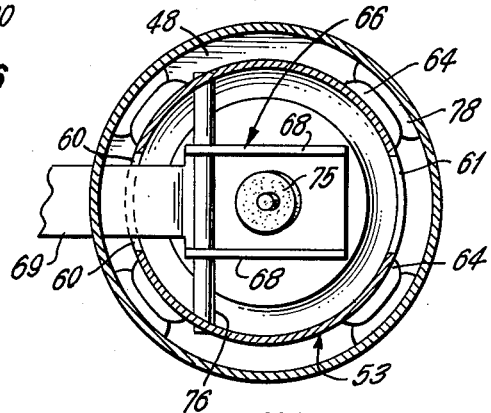
FIG. 6 is a horizontal section taken substantially on the line 6—6 of FIG. 5.
Figure 7:
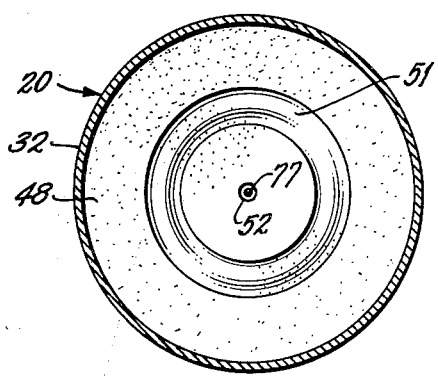
FIG. 7 is a sectional view taken substantially on the line 7—7 of FIG. 3.
Figure 8:
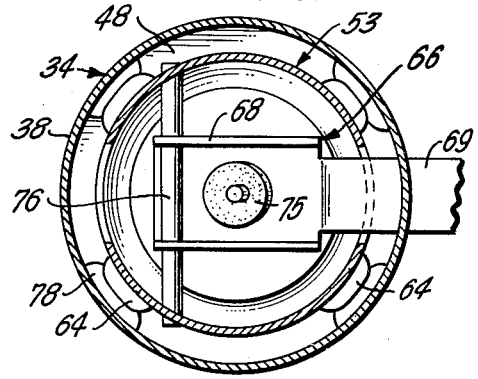
FIG. 8 is a sectional view taken substantially on the line 8—8 of FIG. 3.

Referring now more particularly to the drawings, FIG. 1 shows a single linear trough structure which is generally designated 10, having associated therewith the float controlled valve by means of which water is supplied to the trough from a supply pipeline connected with a suitable water source, not shown. The trough 10 is shown as being of V cross section, having the downwardly converging side walls 12 and being closed at each end by a wall 14, one only of which is shown. The top of the trough is open as naturally is required, so that the chickens or other animals may readily drink therefrom.

The trough structures 10 may be maintained in operation position in any suitable manner, the means here illustrated consisting of suspension cables, one only of which is shown and designated 16, connected with looped portions 18 which pass around the trough and while no means is shown for raising and lowering the cables, it is obvious that various types of mechanism might be connected with the cables for elevating the trough or for adjusting its position with respect to the floor of the chicken house in which the structure is used.

The control valve in one embodiment is generally designated 20 and it is supported within the trough by a suitable bracket such as that here shown and designated 22. This bracket is illustrated as being in the form of a bridge which rises above the open top of the trough and extends thereacross from one side to the other and comprises a top plate 24 and vertical end plates 26 which are joined at their bottom edges to the trough side walls 12. Here also it is to be pointed out that the specific structure shown for suspending the valve in the trough is not intended to be limiting in any way upon the invention or its manner of use. Obviously the valve can be mounted or suspended over or in the trough by other means connected therewith.

The top or plate 24 of the bracket 22 is provided with a suitable opening 24' through which a portion of the valve structure extends and such portion of the valve structure, hereinafter specifically identified, is connected by a coupling nut 30 with a water supply pipe 31.

The supply valve 20 comprises a housing 32 formed in two parts or sections 33 and 34 which, for convenience of description, will be referred to as the top section and bottom section, although in some installations the top section 33 might be lowermost as for example, in the illustration forming FIG. 5 where the water supply comes in from the bottom.

The housing 32 is preferably of circular form and the top section 33 consists of a top wall 35 which joins an encircling side wall 36 while the bottom section consists of the bottom wall 37 and the encircling side wall 38. The walls 36 and 38 are of the same inside and outside diameter and are detachably coupled together in the manner hereinafter described.

The top wall 35 is formed in its central part in the shape of a dome 39 from the center of which there extends upwardly the tubular portion 40.

Within the dome 39, coaxial with the tubular portion 40 and directed into the housing, is an annular means forming a valve seat or diaphragm seat 41 which lies in a plane slightly above the plane of the inner or under surface of the outer part of the wall 35. This seat-forming means is here illustrated as being provided by the inner end of a nipple 42 which extends through and is joined to the inner wall surface of the tubular extension 40 and thus the inner end of the nipple extends into the interior area defined by the dome 39 and which area is designated 43 and functions, as will be hereinafter apparent, as a receiving chamber for fluid supplied to the valve casing by way of the nipple 42. The outer end of the nipple 42 is screw threaded as indicated at 44 to have attached thereto the exteriorly threaded nipple 45 which passes through the opening 24' and receives the flange nut 30 which effects the connection between the valve housing and the water supply pipe 31 in an obvious manner.

Where the supply valve structure is to be used in a linear trough as shown in FIG. 1, the dome portion is formed with two water outlets 46 with each of which is connected an end of a long tube or pipe 47 for distributing water in opposite directions in the trough in the manner which will be obvious from consideration of FIG. 1. In this figure it will be seen that the tubes or pipes 47 extend lengthwise of the trough and may be of suitable length to extend substantially to the ends of the trough from the valve housing at the central position intermediate the ends of the trough in which the housing is mounted.

While the structure in FIGS. 1 and 2 has been shown as having the two distributing pipes or tubes, it will be apparent from reference to FIG. 16 that the device may also be employed in a watering trough structue embodying several arms which may radiate from a central location for the valve structure, in which the valve structure would be equipped with a distributing pipe or tube for each of the arms or extensions of the trough.

Located within the top portion 33 against the underside of the top wall 35 is a resilient diaphragm 48 which is of a diameter to fit snugly within the circular wall portion 36. This diaphragm is formed of a suitable elastomer, such as rubber or a suitable plastic, and it is formed with an outer perimeter portion 49 and a central circular portion 50, the latter being joined to the annular perimeter portion 49 by the thin connecting web 51. The outer portion of this thin connecting web 51 defines a circle which approximates the circular area 43 or, in other words, defines a circle which is approximately the same as the domed portion 39 and the portion 50 is adapted to be moved or flexed outwardly into sealing contact with the seat 41 in thes closing of the valve, as illustrated in FIG. 4.

The movable central portion 50 has a central aperture 52 therethrough for the purpose hereinafter set forth.

Maintaining the flexible diaphragm 48 in position is an annular shell which is generally designated 53. This annular shell has the circular wall 54 and an end wall 55, but is open at the opposite end. The middle portion of the wall 55 is inset as shown and is thus encircled by the annular rib or shoulder 56 which, when the shell is in position in the housing, bears against the underside of the portion 49 of the diaphragm outside of the circle defined by the web 51.

At is center the wall 55 is shaped to provide the inwardly projecting frusto-conical formation 57 having the central opening 58 and the rim of which opening forms a valve seat 59.

The circular wall 54 of the shell 53 has formed therein the diametrically opposite relatively wide slots 60 and 61. In addition to the slots the wall 54 has formed therethrough aligned openings 62, the line of which openings lies to one side of the axial center of the circular shell or, in other words, at one side of an axis line passing through the opening 58. In the illustration of the structure the aligned openings or the axis line of the openings 62 passes between the axis line of the shell and the wall slot 60.

The shell wall 54 carries a circular series of outwardly projecting lugs 63 which lie in a plane adjacent to the wall 55 and lying in another plane perpendicular to the axis of the shell and removed from the plane of the circular series of lugs 63 toward the open end of the shell, is a second circular series of outwardly projecting lugs which are designated 64.

As shown in FIGS. 3, 4 and 5, the shell 53 is of smaller diameter than the interior diameter of the housing parts 33 and 34 in which it is centrally located coaxially with the inlet nipple 42 and when in position therein the annular rib 56 is pressed against the inner side of the gasket.

Figure 9:
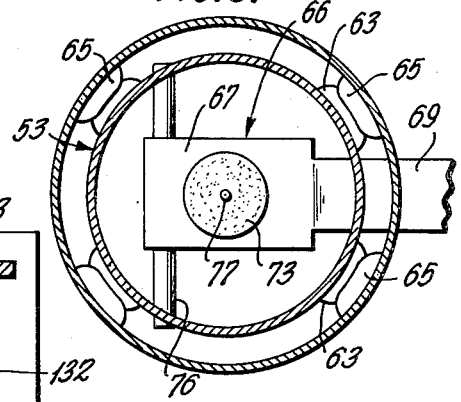
FIG. 9 is a sectional view taken substantially on the line 9—9 of FIG. 4.

The shell 53 is maintained in position in the housing and in engagement with the gasket 48 by the coaction of the lugs 63 with inwardly projecting lugs 65 carried by the wall 36 of the top part 33. These housing carried lugs 65 are in a circular series within the housing and are shown in FIG. 9 to be four in number for coaction with a corresponding number of the shell-carried lugs 63.

As shown in FIG. 11 the shell carried lugs 63 as well as the lugs 64 which are in a plane axially removed from the plane of the lugs 63, are slightly inclined with respect to the plane in which they are located or, in other words, a plane passing transversely through the shell perpendicular to the axis thereof and passing through the lugs, has the lugs slightly angled with respect to such plane so that when the shell is positioned in the housing part 33, by rotating it in one direction the high ends of the lugs, which are elongated in the direction of the circumference of the shell, can be made to ride onto the adjacent housing lugs so as to firmly lock the shell in position. It will be understood, of course, that when the shell is placed in the housing part 33 and rotated as described, to ride the lugs 63 onto the housing carried lugs 65, the annular rib 56 will then be forced tightly against the gasket 48 to secure the latter in position.

The bottom part or bottom half 34 of the housing in effect functions as a closure cap and accordingly is the last part which is joined to the assembly.

The shell 53 carries and encases a pivotally mounted valve button carrying support 66 which is of elongate transversely U-shaped form and comprises the top plate 67 and the opposite longitudinal flanges 68. One end of the plate 67 is connected with the elongate float arm 69 and the outer end of the arm is joined in a suitable manner to a float body 70. While this float body 70 may be of any suitable size or shape, it is here shown in the preferred form of an elongate hollow cylinder into one end of which the outer end of the arm 69 extends and is fixed.

At the end of the plate 67 remote from the float arm 69 the flanges 68 have formed therethrough the transversely aligned pivot pin receiving apertures 71.

At the opposite end of the plate 67 the flanges 68 have formed therethrough the transversely aligned pivot pin apertures 72.

Intermediate its ends the plate 67 carries upon the top side, which is the side opposite that from which the flanges 68 project, an elastomer valve button 73 which is fixed thereto in a suitable manner as, for example, by having a portion extended through an opening 74 in the plate 67 and being enlarged on the opposite side of the opening to form a collar 75 by which the button is held in position. This button 73 is located in the valve structure to engage, in the closed position of the valve, against the seat 59, thus shutting the opening 58 which is formed through the wall 55 of the shell, as shown in FIG. 4.

The valve button carrying and float actuated body 66 is pivotally supported upon a pivot pin 76 which extends transversely of the flanges 68 through one or the other of the pair of aligned apertures 71 or 72 and has its ends extended through the openings 62 in the wall 54 of the shell 53. When the valve button supporting body is thus pivotally mounted in the shell, the float arm 69 extends outwardly through one of the slots 60 or 61.

The pair of apertures 71 or 72 through which the pivot pin 76 extends, as well as the slot 60 or 61 through which the float arm extends in the operative assembly of the valve structure depends upon whether the valve is set up in the position in which it is shown in FIG. 1 where the water supply pipe comes in from above, or in the position shown in FIG. 5 where the water supply pipe comes in from below, as hereinafter more fully explained.

The valve button 73 has fixed in the center thereof one end of a wire 77 which is of substantial length as shown, and is designed to extend upwardly from the button through the aperture 58 in the end wall 55 of the shell 53 and through the central aperture 52 in the diaphragm and for some distance into the water inlet nipple 42 as illustrated.

After the shell and the valve button carrying body have been assembled in the manner described and the shell has been fixed in the top part or top half 33 of the valve housing, the lower half or part 34 of the valve housing which, as hereinbefore stated, functions as a closure or cap, is coupled with the lower series of lugs 64 carried by the shell 53 by means of inwardly projecting lugs 78 carried by and extending inwardly from the wall 38 of the lower portion 34 of the housing. It will be readily obvious that this connection between the lower or open end of the shell and the housing portion 34 is accomplished by suitably turning the housing portion 34 so as to cause the lugs 78, which are in a circular series lying in a plane perpendicular to the axis of the housing, to ride onto the lugs 64.

The wall 38 of the lower portion 34 of the housing is provided with a slot or recess 79 which receives the float arm 69 and permits the rocking movement of the same on the pivot pin 76.

It will be noted that when the two portions 33 and 34 of the housing are assembled, there remains a slot 80 between the opposing edges of the walls 36 and 38. This has a double function in that it permits escape of water entering the housing and as this slot is at least as large or larger than the thickness of the float arm 69, it permits the float arm to be held in position while the lower portion 34 of the housing is put in place and rotated until the recess 79 comes into line transversely of the housing with the adjacent shell wall recess 60 or 61. This initial position of the float arm 69, which it assumes in the operation of applying the lower portion 34, is shown in FIG. 4 although this figure is primarily intended to show the closed position of the valve parts when the trough is filled with water and the float has been elevated to valve closing position.

It will also be noted upon reference to FIGS. 3, 4 and 5, that the diameter of the wire 77 is materially less than that of the opening 58 in the shell wall 55 and the opening 52 in the diaphragm 48. Thus when the wire extends through these openings there will be a space around the wire for water to pass through the openings so that the valve may function properly, as will be hereinafter described.

In FIG. 5 the valve structure has been shown set up for use in an inverted position from that shown in FIGS. 3 and 4 where it may be desirable to connect the water supply pipe from below instead of from overhead. Obviously all of the parts are the same whether the valve is used in this position or in the upright position, the only difference being that the pivot pin will be shifted from the openings 71 in which it is shown in FIGS. 3 and 4, to the openings 72 so that the pivot axis for the valve button carrying body is then nearer to the end of the float arm 69. Also when set up in this position shown in FIG. 5, the arm will pass through the slot or recess 60 in the wall of the shell 53 instead of through the slot or recess 61 as shown in FIGS. 3 and 4. Accordingly it will be seen that when the float is shown in the down or lowered position, as it will be when the water level in the trough is low, the valve button 73 will be unseated and obviously when the float rises the valve button will return to the seat 59.

FIGS. 12 to 15 illustrate another embodiment of the invention operating on the same principle as the first described embodiment but with a slightly different construction. In this second embodiment the valve diaphragm encasing housing is generally designated 100. This housing embodies the two parts or sections 101 and 102 which correspond respectively to the part 33 and the shell 53.

Figure 12:
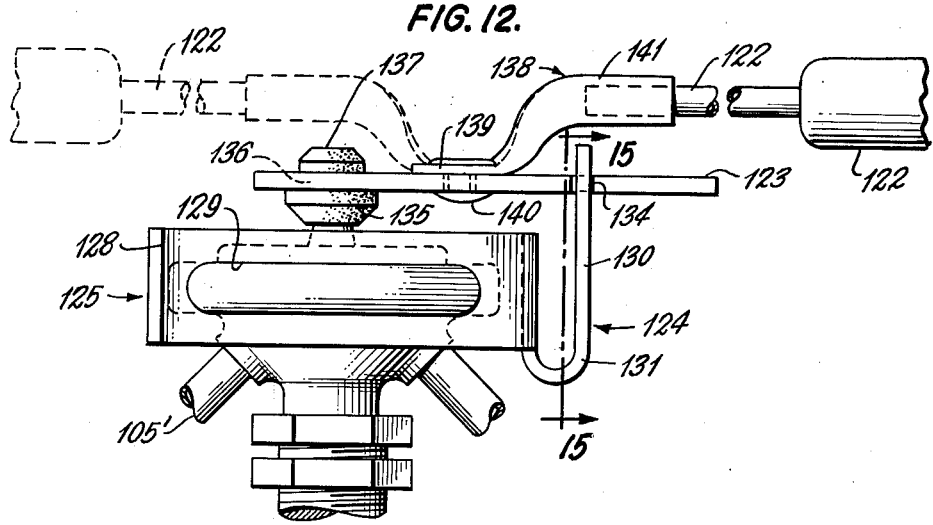
FIG. 12 is a view in side elevation of a modified embodiment of the valve structure and of the mounting of the float associated therewith.
Figure 13:
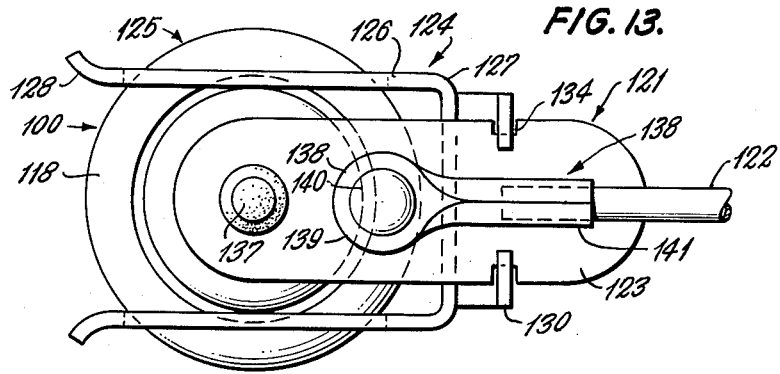
FIG. 13 is a view in top plan of the structure shown in FIG. 12.
Figure 14:
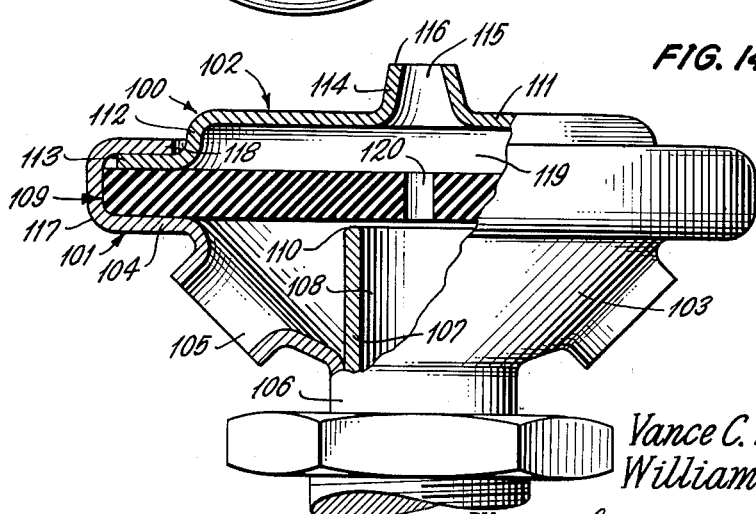
FIG. 14 is a view partly in side elevation and partly in medial section and on an enlarged scale of the diaphragm housing and diaphragm of the embodiment shown in FIGS. 12 and 13, disassociated from the float attaching means.

The housing 100 is illustrated in FIG. 12 in the position for use with the water supply entering from beneath and accordingly it will be seen that the part 101 is formed to provide a central dome section 103 defined by the surrounding wall 104 and this dome section has water outlet tube connection ports 105 in the wall thereof and between these tubes or centrally of the dome the wall of the dome is joined to the tubular extension 106.

The numeral 107 designates a nipple through which water is conducted into the chamber 108 which the dome forms in association with the diaphragm body 109 and the inner end of this nipple 107 forms a seat 110 against which the central portion of the diaphragm is adapted to bear when the valve is closed.

While in this structure as in the first described embodiment, the seat for the diaphragm is provided by an inwardly directed end of a nipple fitted in the tubular extension of the domed portion of the housing, it will be understood that the invention is not necessarily limited to this exact construction but that any construction may be employed wherein the desired seat for the diaphragm is obtained as, for example, the dome portion of the housing may be formed or cast so that the tube which is now identified as the nipple, would become an integral part of the dome wall.

The portion 102 of the housing 100 corresponds, as hereinbefore stated, to the shell 53 in that it coacts with the domed portion 101 to secure the diaphragm in position and it is formed to provide a water passing opening with a seat for coaction with a shut-off valve button, such opening, seat and valve button, about to be described, corresponding respectively to the opening 58, the seat 59 and the valve button 73.

The portion 102 is formed with a disc-like wall 111 which is joined by a short or low substantially right angularly extending flange 112 with an offset surrounding rim 113. This rim is accordingly an integral part of and extension of the wall 111 and is in a parallel offset plane with the central part of the wall.

At its center the wall part 111 is formed to provide the outwardly projecting frusto-conical extension 114 through the center of which is a water passing opening 115 and the end of this extension defining the opening provides a seat 116 for the hereinafter described valve button corresponding to the valve button 73.

The parts 101 and 102 are joined together and secure the diaphragm 109 in place in the following manner. The diaphragm 109 rests in the peripheral portion thereof against the inner side of the wall 104 and the rim 113 of the portion 102 bears against the opposite side of the diaphragm and a portion of the wall 104 is bent upwardly as at 117 across the edge of the diaphragm and the edge of the rim 113 and is then turned inwardly to form the locking inwardly directed lip 118 and pressed against the outer side of the rim 113 so that these three parts are thus firmly clamped or secured together.

In the first described embodiment of the invention the assembly of the shell 53 with the other parts provides, between the wall 55 of the shell or the area defined by the rib 56, and the central portion of the diaphragm 48, a water chamber which is designated 43′. This water chamber is on the opposite side of the diaphragm from the chamber 43 to function in a manner hereinafter described.

A corresponding chamber to the one referred to and designated 43′ is formed in the second embodiment of the invention between the diaphragm 109 and the offset wall 111 of the portion 102, and is designated 119.

The diaphragm 109 has formed through the center thereof the opening 120 which is aligned with the opening 115 of the frusto-conical part 114.

The numeral 121 generally designates a pivotally mounted valve button carrying body generally corresponding to the body 66 and this body 121 has connected therewith the arm 122 to one end of which the float, not shown, is attached. The body 121 comprises an elongate plate 123 which is mounted for pivotal movement relative to the housing 100, upon a supporting bracket which is generally designated 124.

The supporting bracket 124 comprises a substantially U-shaped clip generally designated 125 and consisting of the spaced parallel leg portions 126 connected by a cross yoke 127. The ends of the legs 126 opposite from the yoke 127 are free one from the other so that the legs may be sprung apart for attaching the clip to the housing and to facilitate this action the free ends of these legs have the short outturned terminal portions 128. The legs 126 are of substantial width and each has formed longitudinally therein the elongate slot 129 the width of which is sufficient to receive the peripheral portion of the housing 100 which is made up of the parts 104 and 118 when this peripheral part of the housing is forced between the legs, it being, of course, understood and being apparent from FIG. 13, that the over-all diameter of this peripheral portion of the housing is materially greater than the space between the legs. Thus opposite portions of the periphery of the housing will enter the slots 129 so that the clip will be firmly maintained in attachment with the housing.

The bracket 124 further includes an upstanding arm 130 which is joined at one end by the reverse bend 131 to an edge of the part 127 of the clip, so that when the clip is attached to the housing the arm 130 will be directed upwardly as shown in FIG. 12, when the valve structure is set up to have the water connection come in from the underside as it is illustrated in this figure. The arm 130 extends a substantial distance above the top edges of the legs 126 of the clip and it is slotted from its top end through a portion of its length as indicated at 132 and the slot near the top of the arm has the edges thereof provided with the short laterally extending slots 133.

The plate 123 is also provided with edge slots 134 adjacent to one end and these edge slots 134 are directly opposite one another across the width of the plate and the intermediate portion of the plate lies in the slot 132 so as to have the slots 133 of the arm and the slots 134 of the plate interlocked as shown to provide a pivotal connection between the plate and the arm.

Adjacent to the end of the plate 123 remote from the edge slots 134 there is fixed to the plate the elastomer valve button 135. This valve button will be properly located when the plate 123 is mounted on the arm 130 to engage the seat 116 when the plate is oscillated in the proper direction.

The button 135 can be attached to the plate in any suitable manner but it is here shown as having a portion passing through an aperture 136 in the plate and enlarged on the opposite side to form the holding collar 137.

The end of the float arm opposite from that to which the float is attached is connected to the plate 123 between the pivot coupling of the same with the arm 130 and the valve button 135, by a finger member 138. This finger member comprises a flat end portion 139 which is joined to the top of the plate 123 by a rivet 140 in such a manner that the finger can be swung around or rotated on or around the rivet. The finger is bent intermediate its ends as shown, so that the opposite end portion 141 is elevated from or spaced from the top of the plate 123 and the inner end of the float arm 122 is joined to this elevated end 141 of the finger in the manner illustrated.

It will be obvious upon consideration of the modified embodiment of the invention shown in FIGS. 12 to 15 that when the valve structure is set up for use with the water supply coming from beneath or from the underside of the housing 100, the elevation of the float by water rising therebeneath will oscillate the valve button carrying body or plate 123 in a direction to bring the button 135 onto the seat 116 as previously stated, and on the other hand, when the float drops, the opening 115 will be uncovered by the removal of the button 135 from its seat.

If the entire unit is to be inverted so that the water supply comes from the top, then the float arm will be swung around to extend in the opposite direction from that shown in FIG. 12 and assume the position in which it is shown in dotted lines, the rivet 140 providing the pivot about which the arm swings. In this setting then, when the float drops or when the water level on which the float rests is lowered, the valve button 135 will separate from the seat 116 and when the float rises the valve button will be returned to its seat.

In describing the operation of the invention in the two embodiments illustrated, reference will first be made to the embodiment shown in FIGS. 1 to 11, inclusive. The description will also be directed to the setting of the valve body in the position in which it is shown in FIGS. 1 to 4.

Assuming now that the trough is empty, as shown in FIG. 1, then the float will be in its lowered position and the valve diaphragm 48 will be separated from the seat 41 and the valve button carrying body 66 will be turned to the position where the valve button 73 is off of the seat 59. Water will then enter the chamber 43 by way of the nipple 42 and will flow outwardly through the tubes 47 to the opposite ends of the trough. Simultaneously the water will pass through the opening 52 into the chamber 43' and through the opening 58 into the shell 53 and escape from the housing 20 by way of the annular slot 80, also passing into the trough.

As the trough fills or reaches a completely filled condition, the float, in rising, will press the button 73 against the seat 59 closing the opening 58. However, the water coming in under pressure will not only continue to pass from the tubes into the trough but will pass into the chamber 43' by reason of the force with which it is entering and as the chamber 43' fills under pressure of the water entering through the opening 52 the pressure will be built up so that there will be a differential between the pressures in the two chambers 43' and 43, forcing the diaphragm central portion to flex upwardly against the seat 41, thereby shutting off the flow of water to the distributing tubes 47 and since the water remains under pressure and this pressure is transmitted through the opening 52 into the chamber 43', the valve will remain completely closed until the float again drops.

In this operation of the valve the up and down movement of the float and the rocking movement of the body 66 will cause the wire 77 not only to move slightly axially in the openings 52 and 58, but the wire will be moved slightly across the openings and thus any particles of matter which may get into the valve will be kept free and prevented from packing in or closing the openings 52 and 58.

Figures 10, 15:
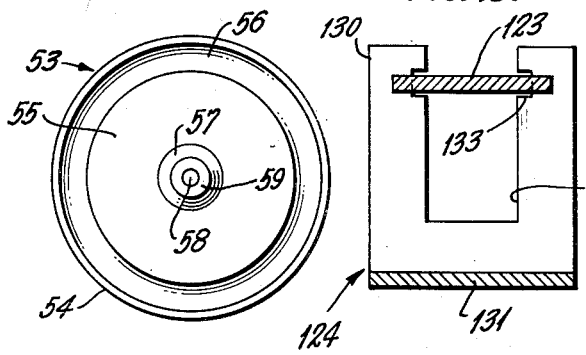
FIG. 10 is a detail view looking into the open end of the inner cylindrical member of the valve housing.
FIG. 15 is a sectional view taken substantially on the line 15—15 of FIG. 12.

Referring now to the modification or second embodiment of the invention shown in FIGS. 12 and 15, it will be apparent from the preceding description that the same action will occur in the rising and falling of the float. That is, considering the position of the valve structures in FIGS. 12 and 13, for example, the float arm is in the raised position so that the valve is closed since the button 135 is pressed against the seat 116. Consequently it will be understood that there will be set up in the chamber 119 a sufficient pressure to overcome the pressure of the water in the chamber 108 so as to flex the diaphragm 109 into engagement with the seat 110. Upon the lowering of the float the arm will rock the plate 123 to raise or remove the valve button 135 from the seat 116 whereupon the pressure in the chamber 119 will be relaxed in the same way that it will be relaxed in the chamber 43' when the float drops and the button 73 separates from the seat 59 to uncover the opening 58. The diaphragm in both embodiments of the invention will then return to its normal position and uncover the water admission opening to permit the water to flow into the chambers 108 and 43 for passage outwardly into the trough by way of the tubes 47, and in the second embodiment, by way of the tubes 105' connected in the openings 105.

From the foregoing, it will be seen that there is provided by the present invention a simple control valve which is particularly well adapted for use in troughs of the character described as well as in other situations where a float operated valve may be of value.

It will be apparent that in those instances where the removal of water from the trough is in small quantities or is slow, there will be enough downward movement of the float to slightly relax the pressure in the chamber 43', or 119, which will then permit slight separation of the diaphragm from its seat, permitting a slow feeding of water into the trough. However, in the event of a rapid removal of water from the trough, as might be brought about by a large number of chickens taking water from the trough at one time, the float would be lowered or would drop more rapidly and thus the pressure differential between the opposite chambers would change quickly and the diaphragm would move farther from its seat to permit a greater or faster flow of water into the trough by way of the tubes and also by way of the openings 58 or 115, which would be uncovered by the valve buttons.

We claim:

1. A valve construction, comprising a housing embodying two separable parts, meanse detachably coupling said parts together, said parts when coupled together forming an enclosed area, one of said parts having a wall with an outwardly extending central dome portion, tubular means extending into the center of the domed portion from the wall thereof and providing a liquid inlet and an inwardly directed annular seat, a diaphragm within the said one part of the housing and extending across said domed portion and forming therewith a first liquid chamber, said diaphragm when flexed in one direction engaging said seat to shut off admission of liquid into said chamber, the diaphragm having a central aperture aligned with the liquid inlet, means for conducting liquid out of said chamber, a cylindrical shell positioned in said enclosed area and having a wall at one end in spaced opposed relation with the side of the diaphragm opposite the first chamber and said end wall having a peripheral axially directed flange bearing against the diaphragm and maintaining the wall portion circumscribed by the flange spaced from the diaphragm to form a second liquid chamber, said shell end wall having a central opening therethrough defined on the side of the wall remote from the second chamber by a valve seat, the other end of the cylindrical shell being opened, means carried by the shell and the housing parts for securing the shell and the two parts of the housing together, a valve button adapted for engagement with said valve seat, a body pivotally supported within the shell and supporting the valve button, a float arm connected with said pivoted body and extending outwardly through openings in the shell and housing, and a float carried by said arm exteriorly of the housing.

2. The invention according to claim 1, wherein the said separable valve parts when secured to said shell are in slightly separated relation for permitting the escape of liquid from the said enclosed area formed by said parts.

3. The invention according to claim 1, with a wire member secured to the center of said valve button and extending therefrom through said aligned wall and diaphragm apertures, said wire member being of a diameter materially less than the diameters of the apertures.

4. A fluid pressure actuated fluid flow control valve, comprising means to provide first and second fluid chambers having a common flexible diaphragm division wall therebetween, fluid inlet means for the first chamber, fluid outlet means for the first chamber, the fluid inlet means including a seat for the diaphragm whereby the inlet means may be closed by the diaphragm, the diaphragm being spaced from said seat in the open condition of the valve, means forming an outlet for the second chamber, means for closing the second chamber outlet, and means for transmitting fluid from said inlet means into the second chamber whereby upon the closing of the second chamber outlet, fluid pressure will build up in the second chamber and press the diaphragm onto said seat to close the fluid inlet, said means for closing the second chamber outlet including a valve element, a pivotally mounted member on which the valve element is carried and a float attached to said member, and an alternative pivot mounting for said member, said valve element being located between the first pivot mounting and the alternate pivot mounting, the control valve being designed to operate in either of two selected inversed positions, the first mentioned pivot mounting and said alternate pivot mounting facilitating the selection of either of said inversed positions of the valve whereby elevation of the float means by supporting fluid will effect actuation of the second chamber outlet closing means into closing position.

5. A valve construction, comprising a housing embodying a part of cylindrical form, having a side wall and an end wall, said end wall being centrally outwardly domed, a fluid inlet tube extending inwardly from the center of the domed portion and providing an inwardly directed annular seat, a diaphragm lying against the inner surface of said end wall across the domed portion thereof and forming therewith a first fluid chamber, the diaphragm having a normal position in which it is spaced from said seat, the diaphragm having an unobstructed central aperture therethrough aligned with the inlet tube, means for conducting fluid out of said chamber, a cylindrical shell of smaller diameter than said cylindrical part positioned concentrically within said part and having a side wall and a wall at one end in opposed relation with said diaphragm, said shell end wall having an annular flange lying against the diaphragm and spacing the central part of the shell end wall from the diaphragm to form a second fluid chamber, said central part of the shell end wall having a central aperture therethrough aligned with the diaphragm aperture, a valve element within the shell, a support member within the shell for said valve element, a pivot mounting for said support member upon which the support member rocks on an axis extending across the shell and positioned to one side of the axial center of the shell to move said valve element to closing and opening position over the aperture in the shell end wall, an arm extending from said support member to the outside of the housing for attachment of a float thereto, and interconnecting elements carried by and between the shell side wall and the encircling opposing side wall of said housing part for coupling said housing part and shell together and said coupling maintaining the shell flange secured against said diaphragm.

6. The invention according to claim 5, wherein the said interconnecting elements comprise outwardly projecting lugs on the shell side wall and inwardly projecting lugs on the side wall of said housing part, formed for overlapping sliding engagement upon relative rotation of said housing part and the shell.

7. A valve construction comprising a housing embodying a first and a second part of cylindrical form, said cylindrical parts being of corresponding diameter and each having a side wall having an inner end edge and an outer end wall, said parts being positioned with the inner end edges thereof opposed whereby the parts form an enclosure, said end wall of said first part being centrally outwardly domed, a fluid inlet tube extending inwardly from the center of the domed portion and providing an inwardly directed annular seat, a diaphragm lying against the inner surface of said first part end wall across the domed portion thereof and forming therewith a first fluid chamber, the diaphragm having a normal position in which it is spaced from said seat, the diaphragm having an unobstructed central aperture therethrough aligned with the inlet tube, means for conductng fluid out of said chamber, a cylindrical shell of smaller diameter than said cylindrical part and positioned concentrically with said parts in said enclosure and having a side wall and a wall at one end, the said one end wall being in opposed relation with said diaphragm, said shell end wall having an annular flange lying against the diaphragm and spacing the central part of the shell end wall from the diaphragm to form a second fluid chamber, said central part of the shell end wall having a central aperture therethrough aligned with the diaphragm aperture, a valve element within the shell, a support member within the shell for said valve element, a pivot mounting for said support member upon which the support member rocks on an axis extending across the shell and positioned to one side of the axial center of the shell to move said valve element to closing and opening position over the aperture in the shell end wall, an arm extending from said support member to the outside of the housing through an opening in one part for attachment of a float thereto, and interconnecting elements carried by and between the shell side wall and the encircling opposing side walls of said housing parts for coupling said housing parts and shell together and said coupling maintaining the shell flange secured against said diaphragm and securing said diaphragm in operating position.

8. The invention according to claim 7, wherein the said interconnecting elements comprise outwardly projecting lugs on the shell side wall and inwardly projecting lugs in the side walls of said housing parts formed for overlapping sliding engagement upon relative rotation of the housing parts and the shell.

9. A valve comprising, a housing having two parts of circular form, said parts being secured together and embodying axially spaced wall portions, a normally flat diaphragm disc interposed between said wall portions, one of said wall portions having a central section extending outwardly away from the diaphragm substantially in the form of a dome and forming with the diaphragm a first fluid chamber, said dome being continued axially away from the diaphragm in a tubular extension, a tubular nipple secured in said tubular extension and projecting at one end into said fluid chamber and terminating short of said diaphragm disc when the disc is in normally flat condition, said end of said nipple forming a seat for said diaphragm disc when the latter is flexed toward said nipple, means for connecting the valve at the outer end of said tubular extension with a fluid supply pipe, for supplying fluid through the nipple to said chamber, means forming a fluid outlet in said dome for discharge of fluid from said chamber, the other one of said wall portions having a central section spaced from a central area of said diaphragm disc and forming with the diaphragm disc a second fluid chamber, said central section of said other wall portion having a part thereof at its radial center extending in the form of a hollow cone away from the diaphragm disc and said hollow cone having a fluid outlet aperture in the apex thereof, the rim of said aperture forming a valve seat, said diaphragm disc having an aperture for passage of fluid therethrough from the first chamber to the second chamber, and float actuated means for closing said aperture comprising an arm, a valve button attached to the arm at one end of the latter, means on the housing for supporting the arm, a pivotal coupling between the arm supporting means and the arm adjacent to said button and a float attached to the arm remote from the said button, the arm when pivoted in one direction, moving said button to close the aperture in said cone.

10. The invention according to claim 9, wherein said supporting means comprises a pin member and the pivotal coupling comprises pivot apertures in the arm through which said pin extends.

11. The invention according to claim 9, wherein the securing together of the said housing parts is effected by a peripheral portion of one of the housing parts extending across a peripheral portion of the other housing part toward the radial center of the said other housing part in the form of a locking inwardly directed lip, and the said means on the housing portion supporting the arm comprises a substantially U-shaped clip having spaced resilient legs adapted to straddle the said peripheral portion of said one of said housing parts and resiliently engage the latter therebetween, and the said pivotal coupling including an upstanding arm carried by said clip on which the valve button carrying arm is supported.

12. The invention according to claim 11, wherein said valve button carrying arm comprises a first elongate part and a second elongate part, the said valve button being on the said first elongate part adjacent to one end of the latter and the first elongate part being connected adjacent to its other end with said upstanding arm to rock on the latter and the said second elongate part being pivotally attached to and intermediate the ends of said first elongate part to turn on the latter and in a plane substantially parallel therewith for altering the operating position of the float relative to the rocking connection of the said first elongate part with said upstanding arm.

13. A valve construction, comprising a housing, a flexible diaphragm therein dividing the housing into a first chamber and a second chamber, means for admitting fluid to the first chamber, means connected with the housing and opening into the first chamber for conducting fluid therefrom, said fluid admitting means including an annular seat against which the diaphragm engages when flexed in one direction to close off the admission of fluid to the first chamber, the diaphragm having a central aperture therethrough in line with the fluid admitting means for the transfer of fluid to the second chamber, said second chamber including a wall having an aperture aligned with the aperture of the diaphragm, said wall aperture having a valve seat therearound on the side of the wall remote from said second chamber, a pivotally supported body adjacent to the apertured wall, a valve element carried by the pivotally supported body and adapted to engage the second mentioned valve seat upon movement of the body in one direction to close the wall aperture, float means connected with said body for rocking the same, an elongate element carried by the pivotally supported body and passing loosely through the wall aperture and the diaphragm aperture and movable with the valve element for maintaining the apertures clear of obstructing sediment, said pivotally supported body having an elongate substantially U-shaped cross sectional form, said float means being connected by an arm with one end of the body, the arm extending from said housing, and means for selectively supporting said body for rocking movement adjacent to either end whereby to facilitate the disposition of the valve unit in either of two working positions.

References Cited in the file of this patent
UNITED STATES PATENTS

| | | |
|---|---|---|
| 551,577 | Chamberlain | Dec. 17, 1895 |
| 703,805 | Murray | July 1, 1902 |
| 988,623 | Bowman | Apr. 4, 1911 |
| 1,854,117 | Devitt | Apr. 12, 1932 |
| 2,502,720 | Haley | Apr. 4, 1950 |
| 2,606,572 | Arnold | Aug. 12, 1952 |
| 2,706,966 | Cline | Apr. 26, 1955 |
| 2,837,111 | Mueller | June 3, 1958 |
| 2,841,170 | Kalsey | July 1, 1958 |
| 2,855,949 | Sterner et al. | Oct. 14, 1958 |
| 2,895,707 | Bailey | July 21, 1959 |
| 2,911,000 | Doyle | Nov. 3, 1959 |
| 2,943,601 | Shank | July 5, 1960 |

FOREIGN PATENTS

| | | |
|---|---|---|
| 381,860 | Germany | Sept. 25, 1923 |